United States Patent
Geiger et al.

(10) Patent No.: US 10,654,515 B2
(45) Date of Patent: May 19, 2020

(54) PIVOT BEARINGS FOR A HEIGHT-ADJUSTABLE STEERING COLUMN

(71) Applicants: THYSSENKRUPP PRESTA AG, Eschen (LI); thyssenkrupp AG, Essen (DE)

(72) Inventors: Adrian Geiger, Balgach (CH); Thomas Geiselberger, St. Gallen (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 236 days.

(21) Appl. No.: 15/770,692

(22) PCT Filed: Nov. 2, 2016

(86) PCT No.: PCT/EP2016/076342
§ 371 (c)(1),
(2) Date: Apr. 24, 2018

(87) PCT Pub. No.: WO2017/076858
PCT Pub. Date: May 11, 2017

(65) Prior Publication Data
US 2018/0312189 A1    Nov. 1, 2018

(30) Foreign Application Priority Data
Nov. 5, 2015 (DE) .......................... 10 2015 119 047

(51) Int. Cl.
*B62D 1/189* (2006.01)
*F16C 11/02* (2006.01)
(Continued)

(52) U.S. Cl.
CPC .............. *B62D 1/189* (2013.01); *F16C 11/02* (2013.01); *F16C 11/045* (2013.01); *F16C 17/08* (2013.01);
(Continued)

(58) Field of Classification Search
CPC ................................ F16C 11/045; B62D 1/189
See application file for complete search history.

(56) References Cited

U.S. PATENT DOCUMENTS

| 5,609,421 | A | * | 3/1997 | Schulze-Eyssing | .... F16C 11/02 384/125 |
| 2008/0216597 | A1 | * | 9/2008 | Iwakawa | ................ B62D 1/181 74/493 |

(Continued)

FOREIGN PATENT DOCUMENTS

| CN | 103025597 A | 4/2013 |
| CN | 103889821 A | 6/2014 |

(Continued)

OTHER PUBLICATIONS

English Translation of International Search Report issued in PCT/EP2016/076342, dated Jan. 19, 2017 (dated Jan. 31, 2017).

*Primary Examiner* — James A English
(74) *Attorney, Agent, or Firm* — thyssenkrupp North America, LLC.

(57) ABSTRACT

A height-adjustable steering column for motor vehicles may include an outer sleeve that receives a steering spindle and is connected to an actuating unit. The actuating unit can be mounted pivotably by way of two pivot bearings on a retaining unit, which can be fixedly connected to a vehicle chassis. The two pivot bearings may be disposed at a horizontal distance to one another on a pivot axis and may each comprise a dihedron projection and a recess that engages with the dihedron projection. Each recess may comprise an introduction region for introduction of the respective dihedron projection in a radial direction with respect to the pivot axis. An inner span of the introduction region may correspond to a smaller outer diameter of the dihedron projection and may form a transition into a partially circular bearing region, an inner diameter of which (Continued)

may be adapted to a larger outer diameter of the dihedron projection so that the dihedron projection is mounted pivotably in the bearing region after a rotation about the pivot axis by approximately 90°.

7 Claims, 3 Drawing Sheets

(51) Int. Cl.
*F16C 11/04* (2006.01)
*F16C 17/08* (2006.01)

(52) U.S. Cl.
CPC ...... *F16C 2326/01* (2013.01); *F16C 2326/24* (2013.01)

(56) References Cited

U.S. PATENT DOCUMENTS

| | | | |
|---|---|---|---|
| 2015/0191195 A1* | 7/2015 | Domig | F16C 27/063 384/29 |
| 2018/0273080 A1* | 9/2018 | Martinez | B62D 1/181 |
| 2019/0152510 A1* | 5/2019 | Shiroishi | B62D 1/192 |

FOREIGN PATENT DOCUMENTS

| | | | | |
|---|---|---|---|---|
| CN | 104379430 A | 2/2015 | | |
| DE | 195 31 278 C | 1/1997 | | |
| DE | 10 2008 062 634 A | 8/2009 | | |
| DE | 102012100701 A | 8/2013 | | |
| EP | 1847440 A | 10/2007 | | |
| WO | WO-2009106257 A1 * | 9/2009 | | G05G 1/06 |

* cited by examiner

PIVOT BEARINGS FOR A HEIGHT-ADJUSTABLE STEERING COLUMN

CROSS REFERENCE TO RELATED APPLICATIONS

This application is a U.S. National Stage Entry of International Patent Application Serial Number PCT/EP2016/076342, filed Nov. 2, 2016, which claims priority to German Patent Application No. DE 10 2015 119 047.8, filed Nov. 5, 2015, the entire contents of both of which are incorporated herein by reference.

FIELD

The present disclosure generally relates to steering columns, including height-adjustable steering columns for motor vehicles.

BACKGROUND

A height-adjustable steering column for a motor vehicle is known from DE 195 31 278 C1. This discloses a pivot axis arrangement, wherein the centering between retaining unit and actuating unit is achieved by means of a sleeve. The high mounting outlay and complicated structure are disadvantageous in the case of this solution.

Thus a need exist for an improved pivot axis arrangement of a steering column that comprises a simple and low-cost structure.

DETAILED DESCRIPTION

Figure 1:
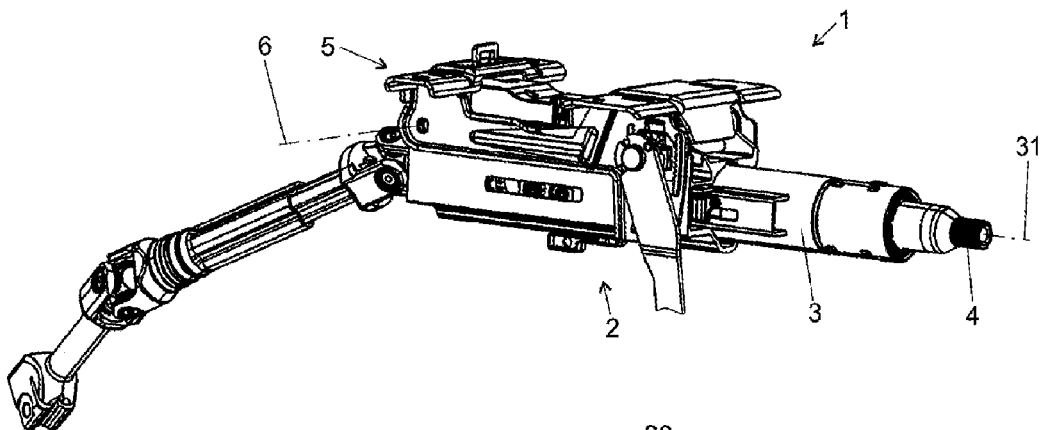
FIG. 1 is a perspective side view of an example height-adjustable steering column.
Figure 2:
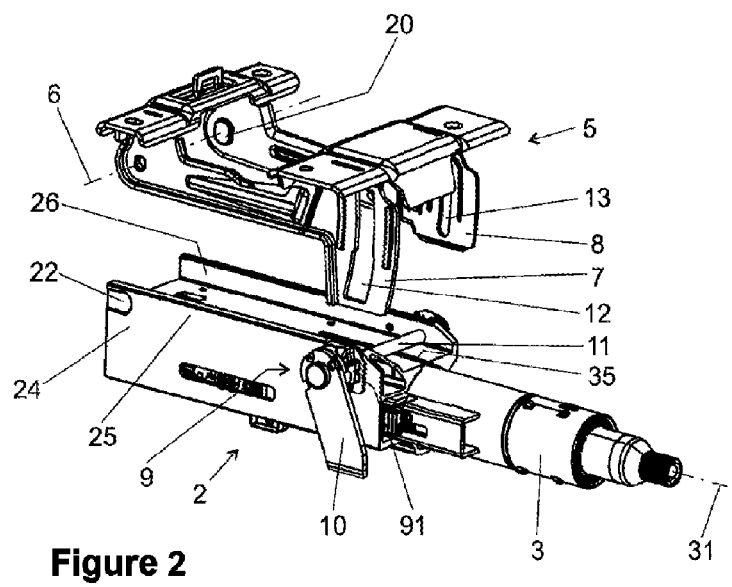
FIG. 2 is a perspective side view of an example retaining unit and an example actuating unit connected to an outer sleeve of the steering column of FIG. 1.
Figure 3:
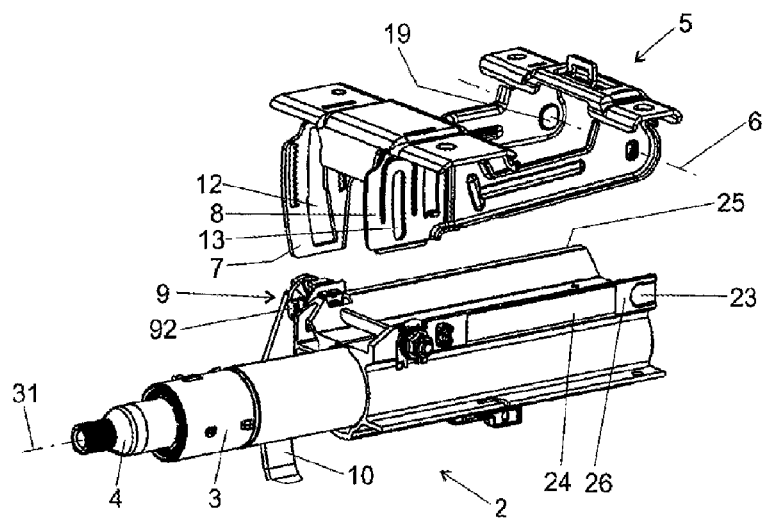
FIG. 3 is another side view as in FIG. 2, but from an opposite side, of the example retaining unit and the example actuating unit connected to the outer sleeve of the steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a height-adjustable steering column for a motor vehicle. In some examples, a height-adjustable steering column may include an actuating unit, in which a steering spindle is rotatably mounted. The actuating unit may be mounted pivotably on a retaining unit, which can be fixedly connected to the vehicle chassis, by means of two pivot bearings arranged at a horizontal distance to one another on a pivot axis.

In some examples, a height-adjustable steering column for a motor vehicle may include pivot bearings that comprise in each case an axial protruding dihedron projection and a recess that is in engagement with the dihedron projection that comprise in each case an introduction region for introduction of the dihedron projection in the radial direction with respect to the pivot axis. The introduction region may comprise an inner span that is formed adapted to a width of the dihedron projection, and the introduction region may form a transition in each case into a partially circular bearing region, the inner diameter of which may be adapted to the outer diameter of the dihedron projection so that it is mounted pivotably in the bearing region after a rotation about the pivot axis by at least 5°.

The term adapted is to be understood such that the introduction of the dihedron projection into the introduction region and the bearing in the bearing region is in each case easily enabled. The inner span of the introduction region and the width of the dihedron projection are formed corresponding with one another with a clearance fit or transition fit. The outer diameter of the dihedron projection and the inner diameter of the bearing region of the recess are also formed with respect to one another with a clearance fit or transition fit.

The solution according to the invention has the advantage that it enables simple joining together of the actuating unit and retaining unit in a tool-free manner without mounting additional parts such as, for example, sleeves and simultaneously ensures reliable mounting.

The recess can be provided by a depression, also known as a recess, in the material or by a continuous opening in the material.

The term dihedron projection refers to a projection, the cross-sectional surface of which, which is arranged orthogonally with respect to the direction of extent of the projection, comprises a base circle which is limited by two parallel secants and as a result is restricted. In other words, the base circle is reduced by two symmetrically arranged circular segments. The restriction of the cross-section of the dihedron projection is thus formed by two opposing circular arc portions, which correspond to the base circle and the base circle diameter thereof or are based thereon, and the secants. The secants preferably have an identical distance to the circle center point of the base circle or are congruent with the circle segments. The width, also referred to as the span, of the dihedron projection is defined by the distance between the secants. The distance between the secants, i.e. the width of the dihedron projection, is preferably between 5% and 30% lower than the value of the base circle diameter, particularly preferably the width is 10% smaller than the base circle diameter.

In order to further simplify mounting, the dihedron projection is mounted pivotably in the bearing region after rotation about the pivot axis preferably by at least 10°, particularly preferably by 45°.

The rotation of the dihedron projection about the pivot axis must be less than 180°. Otherwise, displacement of the dihedron projection into the introduction region could arise so that the dihedron projection is no longer received pivotably in the bearing region.

In one preferred further development, an outer sleeve is received in the actuating unit, in which outer sleeve the steering spindle is mounted, preferably by anti-friction bearings. The outer sleeve is displaceable with respect to the actuating unit in the direction of the axis of rotation of the steering spindle. Length adjustment can, as a result, be provided in addition to height adjustment.

The stated pivot bearing units are joined together in that they initially occupy an angle with respect to one another in which the dihedron projection can be introduced with a narrow side into the relatively narrow introduction region of the recess on the respective other pivot bearing unit. Once the dihedron projection has been introduced into the partially circular bearing region of the recess, the actuating unit is rotated with respect to the retaining unit by at least 5°, preferably 10°, particularly preferably 45°, wherein the dihedron projection is also rotated within the bearing region of the recess by the same angle and is accordingly oriented so that it can no longer move in and out of the introduction region. On the contrary, the dihedron projection is supported within the bearing region in all directions of a plane which stands perpendicularly on the pivot axis and is locked against displacement. Only rotations of the dihedron projection within the bearing region of the recess are possible so that the actuating unit is pivotable with respect to the retaining unit within a restricted angle range of a few angle degrees up to 50°, preferably 10° in order to thus enable vertical adjustment of the outer sleeve of the adjustable steering column. As a result of this, a steering wheel which sits on a free end of the steering spindle, which is rotatably mounted in the actuating unit or in the outer sleeve, can be adjusted in the vertical direction.

The dihedron projection can, in each of the two bearings, be provided on the retaining unit and the recess can be provided on the bearing points of the actuating unit or vice versa. In the exemplary embodiment explained in greater detail below, the dihedron projections are provided in each case on the opposing inner sides of the side parts, which protrude downwards from the vehicle chassis, of the retaining unit, while the recesses are formed on the outer sides of the actuating unit. The actuating unit is arranged between the side parts of the retaining part so that in each case one of the outer sides of the actuating unit is arranged adjacent to one of the side parts so that they lie opposite one another. In this case, the open side of the introduction region of the recesses is oriented in a direction parallel to the axis of rotation of the steering spindle and towards the side facing away from the steering wheel.

One embodiment which is particularly easy to produce provides that the dihedron projection and/or the recess are formed by means of reshaping of the actuating unit and/or the retaining unit. The retaining unit can preferably be represented from a flat metal sheet by means of metal sheet cutting reshaping technology. The recess can preferably be formed by fine punching as a continuous opening. It is also conceivable and possible to form the recess by milling. This is particularly preferred in the case of representation of the retaining part by means of aluminum or magnesium casting technology.

If the dihedron projection in its outer circumferential region and/or the recess in the inner circumferential region have a conical configuration or are provided with a chamfer, manufacturing tolerances are advantageously balanced out and there is no play in the pivot bearings. Centering is furthermore provided as a result of this. The chamfer preferably comprises an angle, relative to the pivot axis, with a value between 20° and 60°, particularly preferably between 35° and 55°.

In a further advantageous embodiment, it is provided that a pivot pin extends through the dihedron projections and the recesses. A bore is provided for this purpose which extends along the pivot axis through the dihedron projections and the recesses. In other words, the bore is composed of several individual bores which are aligned coaxially with respect to one another, wherein the bore axes coincide with the pivot axis. This pivot pin ensures that the pivot bearings can in no way detach even in the case of extreme actions of force on the steering column, for example, during an accident.

A height-adjustable steering column 1 for a motor vehicle, in the case of which an outer sleeve 3 is received displaceably in an actuating unit 2, is apparent in FIG. 1. A steering wheel, not shown, can be attached on the free end of a steering spindle 4 mounted in outer sleeve 3. Actuating unit 2 is retained by a retaining unit 5 and mounted pivotably about a pivot axis 6 with respect to retaining unit 5. Retaining unit 5 can be connected to a vehicle chassis, not shown.

Retaining unit 5 is furthermore provided with two clamping jaws 7, 8, between which actuating unit 2 can be clamped. A clamping device 9, which is provided on the actuating unit, with an activation lever 10 serves this purpose. A clamping pin 11 arranged on actuating unit 2 also penetrates, in the mounted state, through two slots 12, 13 in clamping jaws 7, 8. When activating clamping device 9 by means of activation lever 10 in the opening direction, actuating unit 2 is displaceable with clamping pin 11 within slots 12, 13 upwards and downwards, wherein the entire actuating unit 2 is pivoted in its pivot bearings 14, 15 about pivot axis 6. It can also be provided that outer sleeve 3 can be displaced with respect to actuating unit 2 in the direction of axis of rotation 31 of steering spindle 4 so that steering column 1 is also adjustable in the longitudinal direction. If a desired height of steering column 1 and the steering wheel is reached, activation lever 10 is moved into the closing position, wherein clamping device 9 presses together clamping jaws 7, 8 and, between these, clamps actuating unit 2 with outer sleeve 3 of the steering column. Actuating unit 2 comprises a clamping slot 35 which extends in the direction of axis of rotation 31 of steering spindle 4, wherein this clamping slot is reduced in its width by the transfer of clamping device 9 into the closing position. As a result, the inner cross-section of actuating unit 2 in which outer sleeve 3 is received is reduced and thus outer sleeve 3 is clamped in actuating unit 2. Since retaining unit 5 can be fixedly connected to the vehicle chassis, not shown, steering column 1 is thus also immovably fixed with respect to the vehicle chassis.

Outer sleeve 3 can, in the event of a vehicle accident, also referred to as a crash, be displaced with respect to actuating unit 2 in the direction of the front of the vehicle with energy absorption, in which outer sleeve 3 telescopes into actuating unit 2. A bending wire, which is deformed by the displacement of outer sleeve 3 with respect to actuating unit 2, can be provided for this purpose, for example, between outer sleeve 3 and actuating unit 2.

In one embodiment variant, not represented, the outer sleeve is only displaceable with respect to the actuating unit in the event of a crash.

Clamping device 9 comprises a first cam part 91 and a second cam part 92 connected to activation lever 10, wherein second cam part 92 is rotatable by means of activation lever 10 with respect to first cam part 91, as a result of which a clamping stroke is provided which fixes actuating unit 2 with respect to retaining unit 5. It is also conceivable and possible to use an alternative clamping device, for example, a tilt pin clamping device.

Figure 4:
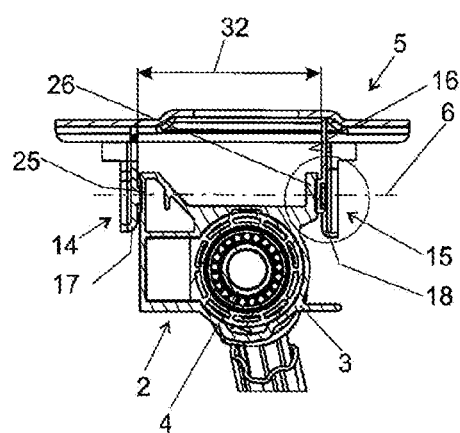
FIG. 4 is a schematic cross-sectional view along a pivot axis through the steering column of FIG. 1.
Figure 5:
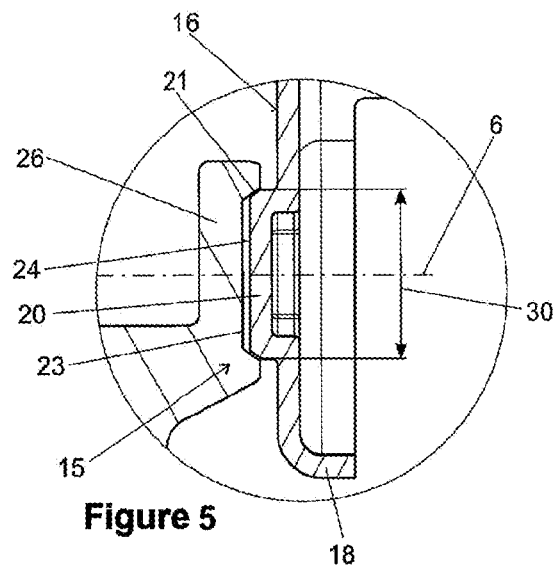
FIG. 5 is an enlarged partial sectional view from FIG. 4 of an example pivot bearing.

Both pivot bearings 14, 15 are represented in detail in FIGS. 4 and 5. On inner sides 16 of downwardly protruding side parts 17, 18 of retaining unit 5, a dihedron projection 19, 20 is formed in each case into respective side parts 17, 18. Dihedron projection 19, 20 comprises a conical configuration 21 in the outer region.

In contrast, recesses 22, 23 are formed in actuating unit 2 on outer sides 24 of upwardly protruding cheeks 25, 26 of actuating unit 2 by reshaping. Recesses 22, 23 comprise in each case an introduction region 27 with an inner span 290 and a partially circular bearing region 28 with an inner diameter 300. Inner span 290 of introduction region 27 corresponds to width 29 of respective dihedron projection 19, 20, wherein these can comprise a small degree of play with respect to one another in order to facilitate joining. Inner diameter 300 of bearing region 28 corresponds to outer diameter 30 of dihedron projection 19, 20. Outer diameter 30 of dihedron projection 19, 20 corresponds to the diameter of base circle 199.

Introduction region 27 and/or bearing region 28 can comprise a plastic coating.

The inner wall portions of the bearing region 28 of recesses 22, 23 are also provided with a conical configurations 21. As can best be seen in FIG. 5, conical configurations 21 of dihedron projection 19, 20 and bearing region 28 of recess 22, 23 lie against one another, as a result of which bearing play of pivot bearings 14, 15 is minimized and centering is also achieved. Introduction region 27 of recesses 22, 23 is arranged substantially in a direction parallel to axis of rotation 31 of steering spindle 4 in such a manner that its introduction opening is oriented towards the side facing away from the steering wheel (not shown). The term "substantially parallel" refers to an angular deviation of ±10°.

Both pivot bearings 14, 15 are arranged at horizontal distance 32 to one another in the direction of pivot axis 6 (see FIG. 4).

Figure 6:
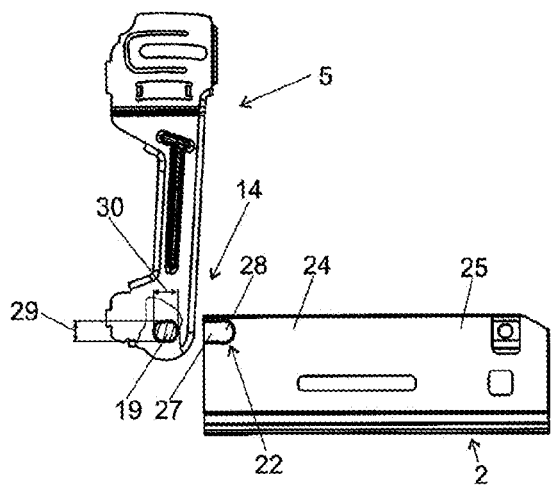
FIG. 6 is a schematic top view of an example pivot unit with an example angled carrier unit prior to joining together of the pivot bearing.
Figure 7:
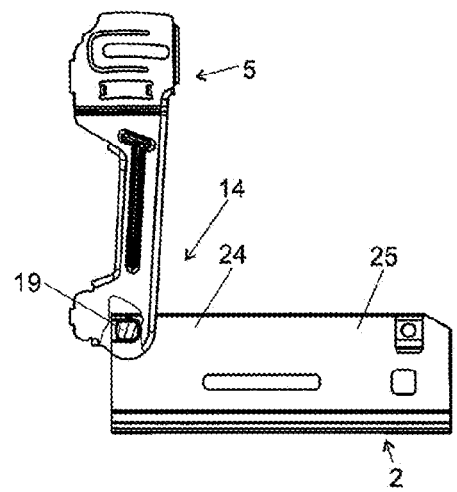
FIG. 7 is a schematic top view as in FIG. 6, but after the introduction of an example dihedron projection of a retaining unit into a recess of the actuating unit.
Figure 8:
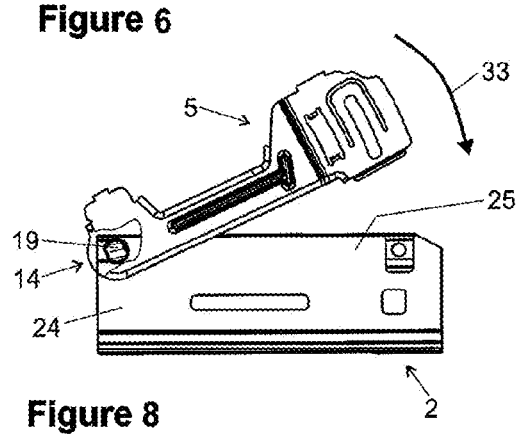
FIG. 8 is a schematic top view as in FIG. 7, but after a rotation of the retaining unit with respect to the actuating unit for translational locking of the dihedron projection of the retaining unit in the recess of the actuating unit.

As can best be seen in FIGS. 6 to 8, the hinged connection between retaining unit 5 and actuating unit 2 is produced in that actuating unit 2 is oriented with its longitudinal extent approximately at a right angle to the longitudinal extent of retaining unit 5. Dihedron projections 19, 20 are then introduced into respective introduction regions 27 of both recesses 22, 23 in FIG. 6 from left to right, wherein width 29 of dihedron projections 19, 20 is pushed through inner span 290 of introduction region 27 until the position shown in FIG. 7 is reached, where dihedron projections 19, 20 are positioned respectively in bearing region 28 of both recesses 22, 23. As shown in FIG. 8, retaining unit 5 is now rotated in direction of rotation 33 with respect to actuating unit 2, wherein dihedron projections 19, 20 are also rotated in bearing regions 28 of respective recesses 22, 23. Rotation in direction of rotation 33 is approximately 90°, but dihedron projections 19, 20 can no longer escape from bearing regions 28 of recesses 22, 23 from a rotation of 5° in direction of rotation 33 because they are rotated in such a manner that their outer diameters 30 no longer pass through smaller inner span 290 of introduction regions 27. Pivot bearings 14, 15 are thus locked in the sense that dihedron projections 19, 20 can no longer slip or move out of recesses 22, 23, but a pivotability of actuating unit 2 with respect to retaining unit 5 within a limited pivoting range of a few degrees up to a maximum of approximately 20° is possible. During normal use of steering column 1, the pivoting range is, due to the design, in any event much smaller than the maximum possible pivoting angle of 10° before the locking of dihedron projections 19, 20 in recesses 22, 23 would be released.

Figure 9:
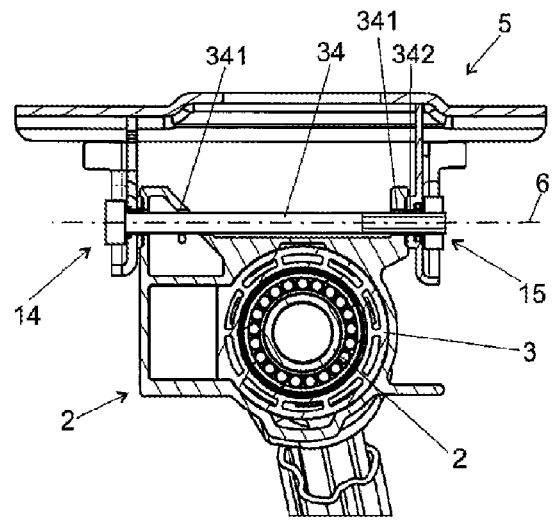
FIG. 9 is a sectional schematic cross-sectional view similar to FIG. 4 of another example steering column with pivot pins that pass through pivot bearings.
Figure 10:
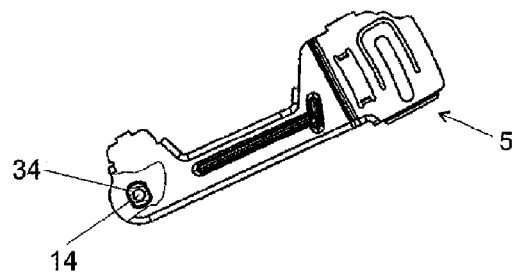
FIG. 10 is a schematic view of an example retaining unit with pivot pins according to the example steering column of FIG. 9.

In the case of a second embodiment shown in FIGS. 9 and 10, a pivot pin 34 is additionally provided which penetrates through both pivot bearings 14, 15 and thus both dihedron projections 19, 20 as well as both recesses 22, 23 and is received in respective bores 341, 342. As a result of this, the stability of pivot bearings 14, 15 is further increased so that they can even withstand the high forces which arise in the event of an accident.

Figure 11:
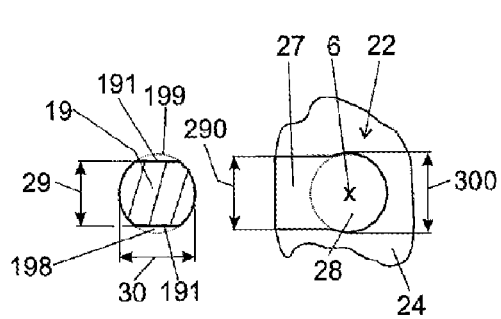
FIG. 11 is a schematic top view as a schematic diagram of an example dihedron projection and a recess prior to joining together.

A schematic top view is represented in FIG. 11 as a schematic diagram of dihedron projection 19 and recess 22 prior to joining together. Dihedron projection 19 comprises, in its cross-section, a base circle 199 with outer diameter 30 which is limited, i.e. flattened, by two parallel secants 191 and is restricted as a result of this. In other words, the base circle is reduced by two symmetrically arranged circular segments 198. Secants 191 comprise an identical distance to the circle center point of base circle 199 and are arranged spaced apart from one another at a width 29. Dihedron projection 19 comprises two circle portions 192 which are based on base circle 199 and comprise outer diameter 30. Circle segments 192 and secants 191 thus form the restriction of the cross-section of the dihedron projection. The value of width 29 is preferably between 5% and 30% smaller than the value of outer diameter 30, particularly preferably width 29 is reduced by 10% with respect to outer diameter 30.

Recess 22 comprises introduction region 27 and bearing region 28, wherein introduction region 27 comprises an inner span 290 and bearing region 28 comprises an inner diameter 300 which is adapted to outer diameter 30 of dihedron projection 19 in order to be able to provide the bearing. Inner span 290 of introduction region 27 is at least as large as inner span 29 of dihedron projection 19, i.e. they are adapted to one another. Inner span 290 of introduction region 27 is furthermore smaller than outer diameter 30 of dihedron projection 19 so that these are adapted to one another. This is necessary to prevent dihedron projection 19 from moving out of bearing region 28 after a rotation of dihedron projection 19 with respect to recess 22 in direction of rotation 33 about pivot axis 6 by an angle of rotation a.

Figure 12:
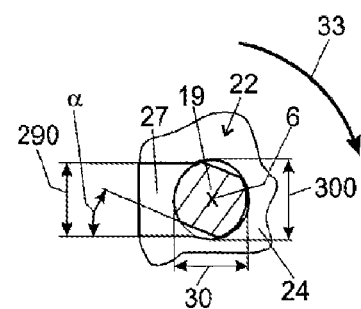
FIG. 12 is a schematic top view as a schematic diagram of the dihedron projection and the recess of FIG. 11 after joining together and after a rotation of the dihedron projection with respect to the recess for translational locking.

After rotation of dihedron projection 19 about an angle of rotation a, dihedron projection 19 is received in bearing region 28, as is represented in FIG. 12 in a schematic top view as a schematic diagram. An angle of rotation a of only 5° is already sufficient to prevent a translational movement of dihedron projection 19 out of bearing region 28. In other words, dihedron projection 19 is already securely received in bearing region 28 and held in a translationally undisplaceable manner therein from an angle of rotation a of 5°.

Pivot bearings 14, 15 according to the invention can be produced in a simple manner with a small number of operations from the material by actuating unit 2 or retaining unit 5 and ensure universal usability alongside low-cost design. The reduction in play of pivot bearings 14, 15 is furthermore ensured by conical configurations 21 of dihedron projections 19, 20 and recesses 22, 23. A further advantage lies in the simple mounting during assembly of actuating unit 2 and retaining unit 5.

LIST OF REFERENCE NUMBERS

1 Steering column
2 Actuating unit
3 Outer sleeve
4 Steering spindle
5 Retaining unit
6 Pivot axis
7 Clamping jaws
8 Clamping jaws
9 Clamping device
10 Activation lever
11 Clamping pin
12 Slot
13 Slot
14 Pivot bearing
15 Pivot bearing
16 Inner sides
17 Side part
18 Side part
19 Dihedron projection
20 Dihedron projection
21 Conical configuration
22 Recess
23 Recess
24 Outer side
25 Cheek
26 Cheek
27 Introduction region
28 Bearing region
29 Width
30 Outer diameter
31 Axis of rotation of the steering spindle
32 Horizontal distance
33 Direction of rotation
34 Pivot pin
35 Clamping slot
191 Secant
199 Base circle
198 Circular segment
290 Inner span of the introduction region
300 Inner diameter of the bearing region

What is claimed is:

1. A height-adjustable steering column for a motor vehicle, the height-adjustable steering column comprising:
a retaining unit that is fixedly connectable to a chassis of the motor vehicle; and
an actuating unit in which a steering spindle is rotatably mounted, wherein the actuating unit is mounted pivotably on the retaining unit by way of two pivot bearings disposed at a horizontal distance to one another on a pivot axis, wherein each of the pivot bearings comprises an axial protruding dihedron projection and a recess that is engaged with the axial protruding dihedron projection, the recess comprising an introduction region for introduction of the axial protruding dihedron projection in a radial direction with respect to the pivot axis, wherein the introduction region comprises an inner span that is adapted to a width of the axial protruding dihedron projection, the introduction region forming a transition into a partially circular bearing region, wherein an inner diameter of the partially circular bearing region is adapted to an outer diameter of the axial protruding dihedron projection so that the axial protruding dihedron projection is mounted pivotably in the partially circular bearing region after a rotation about the pivot axis by at least 5°.

2. The height-adjustable steering column of claim 1 wherein, with respect to each of the two pivot bearings, the axial protruding dihedron projection is disposed on the retaining unit and the recess is disposed on the actuating unit.

3. The height-adjustable steering column of claim 1 wherein the axial protruding dihedron projections are formed, respectively, on inner sides by downwardly protruding side parts of the retaining unit and the recesses are formed on outer sides of the actuating unit.

4. The height-adjustable steering column of claim 3 wherein the introduction region of each of the recesses is oriented parallel to an axis of rotation of the steering spindle towards a side facing away from a steering wheel.

5. The height-adjustable steering column of claim 1 wherein, with respect to each of the two pivot bearings, at least one of the axial protruding dihedron projection or the recess has been reshaped in at least one of the actuating unit or the retaining unit.

6. The height-adjustable steering column of claim 1 wherein, with respect to each of the two pivot bearings, at least one of an outer circumferential region of the axial protruding dihedron projection or an inner circumferential region of the recess comprises a conical configuration or a chamfer.

7. The height-adjustable steering column of claim 1 comprising a pivot pin that extends through the axial protruding dihedron projections and the recesses.

* * * * *